Oct. 5, 1954  C. F. CLIFFORD ET AL  2,691,112
SYNCHRONOUS MOTOR WITH POLARIZED ROTOR
Filed March 10, 1952  2 Sheets-Sheet 1

INVENTORS
CECIL F. CLIFFORD
LESLIE G. M. PAYNE

Oct. 5, 1954   C. F. CLIFFORD ET AL   2,691,112
SYNCHRONOUS MOTOR WITH POLARIZED ROTOR
Filed March 10, 1952   2 Sheets-Sheet 2
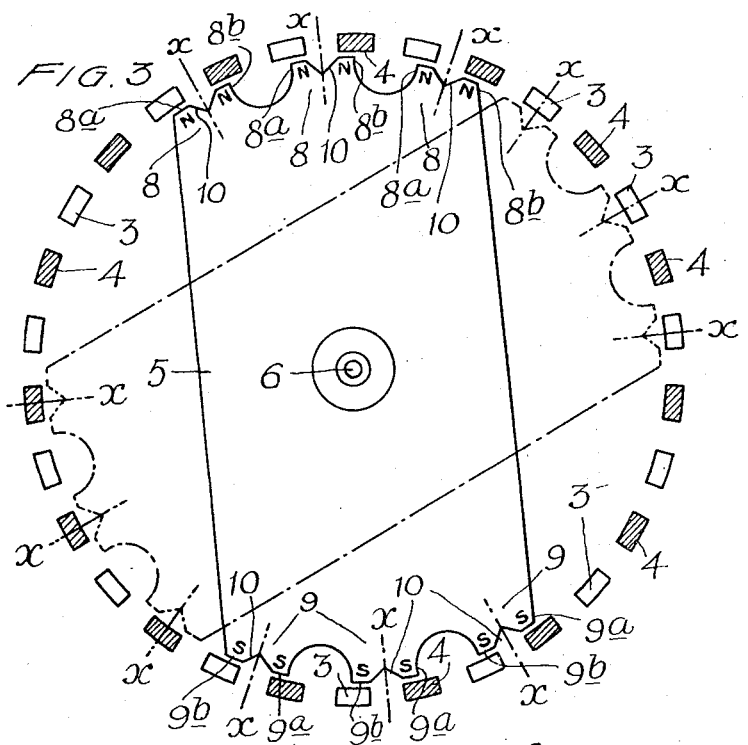
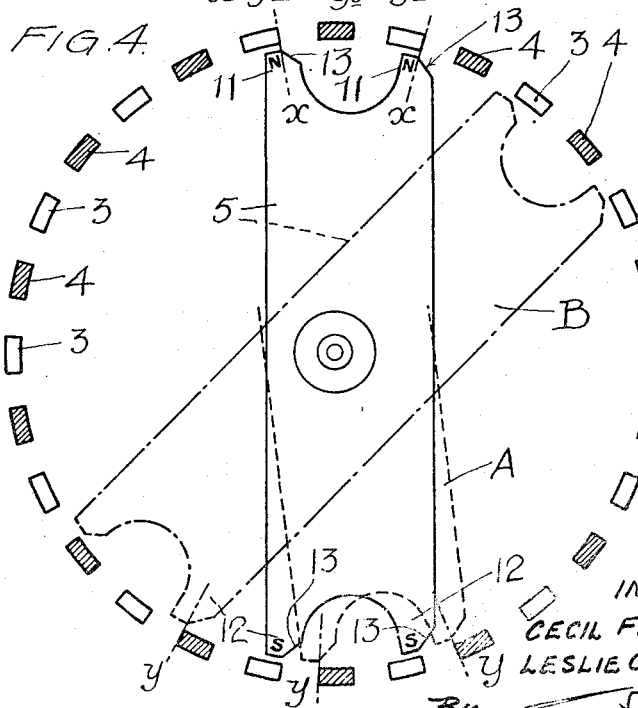
INVENTORS
CECIL F. CLIFFORD
LESLIE G. M. PAYNE

Patented Oct. 5, 1954

2,691,112

UNITED STATES PATENT OFFICE 2,691,112

SYNCHRONOUS MOTOR WITH POLARIZED ROTOR

Cecil Frank Clifford and Leslie George Mountjoy Payne, Bath, Somerset, England

Application March 10, 1952, Serial No. 275,762

Claims priority, application Great Britain March 14, 1951

4 Claims. (Cl. 310—156)

This invention relates to small synchronous electric motors of the well known type, commonly used for driving synchronous clocks, in which the rotor is permanently magnetised and is designed to start spontaneously when the current is switched on.

The object of the invention is to improve the starting properties of such motors.

In motors of the type above referred to as at present used, the rotor normally comes to rest with its poles directly opposite the stator poles, because the positions of the rotor in which the rotor poles are directly opposite the stator poles are the positions of minimum magnetic reluctance of the gaps between the rotor and stator poles. This is the most disadvantageous position for starting, and it is only the inherent instability of the equilibrium of the rotor, during the half-cycles in which it is acted upon by magnetic forces of repulsion, that enables such motors to start when the current is switched on.

According to the present invention, the rotor is constructed so that in the positions of minimum magnetic reluctance between the rotor and stator poles, the rotor poles are so displaced relatively to the stator poles as to be subject to attractive and repulsive forces which exert an immediate starting torque on the rotor when the stator current is switched on. A positive and very reliable starting action is thus achieved.

The poles may be arranged so that the magnetic reluctance of the gaps between the rotor and stator poles falls to a minimum when the rotor poles have their axes opposite the gaps between the stator poles, but this is not essential because the desired effect is obtained so long as the position of minimum reluctance to which the rotor is naturally attracted when the current is switched off is angularly displaced from the position towards which the rotor is attracted when the current is switched on.

The invention will be fully understood from the following more detailed description of two examples of constructions embodying the invention, reference being made to the accompanying drawings in which:

Figure 3 is a diagram drawn to a larger scale showing the arrangement of the stator and rotor poles, and Figure 4 is a view corresponding to Figure 3 showing a modified arrangement of the rotor poles.

Figure 1:
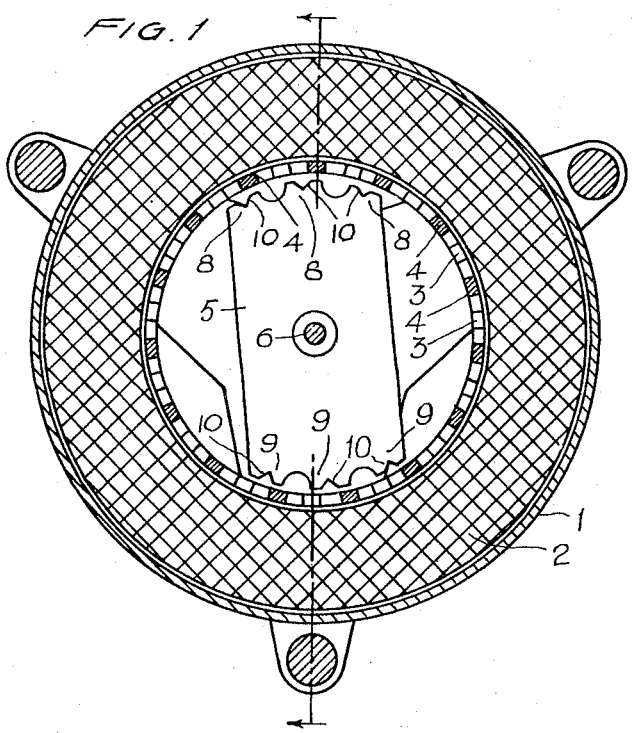
Figure 1 is a sectional view of a motor taken on a plane at right-angles to the rotational axis of the motor.
Figure 2:
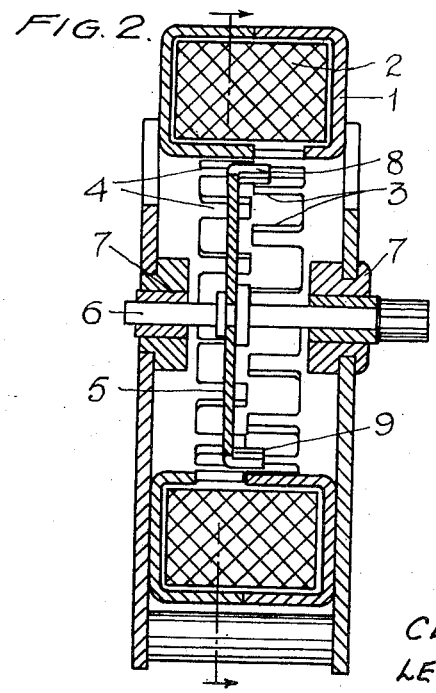
Figure 2 is a section taken on a plane containing the rotational axis.

The motor shown in Figures 1 and 2 has a stator of a well known type of construction consisting of a hollow annular shell 1 composed of two halves which encloses a coaxial magnetising coil 2. The two halves of the shell are separated by an annular gap extending round the inner wall of the shell, and the stator poles are formed by two sets of teeth 3 and 4 formed respectively on the two halves of the shell and projecting towards one another across the gap just referred to. The teeth 3 of one set lie opposite the spaces between the teeth 4 of the other set so that teeth 3 belonging to one set alternate with teeth 4 belonging to the other set round the inner wall of the stator. When current is supplied to the coil 2, the two sets of teeth are oppositely polarised and poles of opposite polarity thus occur alternately round the stator.

The motor has a rotor 5 consisting of a bar or sheet metal plate fixed to a rotatable spindle 6 supported in suitable bearings 7 coaxial with the shell 1. The rotor 5 is permanently magnetised so that its two ends are of opposite polarity. It is formed at one end with teeth 8 and at the other end with teeth 9 forming polar projections for co-operating with the stator poles, the teeth at each end (being of like polarity) being spaced apart by a distance equal to twice the pitch of the stator teeth (i. e. equal to the pitch of either of the two separate sets of stator teeth 3 and 4). The extremities of the teeth 8 and 9 may be bent over as shown in Figure 2 to increase the effective area of their polar surfaces.

In the construction shown in Figures 1, 2 and 3, the rotor 5 is symmetrical in the sense that each tooth 8 at one end of the rotor corresponds to a tooth 9 of opposite magnetic polarity situated in a diametrically opposite position. This requires that stator poles of opposite magnetic polarity should occur in diametrically opposite positions round the stator. The stator will thus require to have an odd number of teeth in each of the two sets 3 and 4. For example there may be fifteen teeth 3 and fifteen teeth 4, making thirty stator poles in all.

As shown in Figures 1, 2 and 3, each of the teeth 8 and 9 forming the rotor poles is made wider than the teeth 3 and 4 forming the stator poles and is bifurcated or divided by forming notches 10 in the rotor. The two polar surfaces 8a and 8b or 9a and 9b (see Figure 3) into which each rotor pole is thus divided are separated sufficiently to ensure that the magnetic reluctance of the gaps between the rotor and stator poles is at a maximum when the axes of the rotor poles (marked $x$ in Figure 3) are in alignment with the stator poles, and falls to a minimum when the axes $x$ are in line with the spaces between the stator poles. This can be readily understood by inspection of Figure 3 of the drawings, in which the rotor is shown in full lines in a position of minimum magnetic reluctance between the rotor and stator poles and is shown for comparison in broken lines in a position in which the axes $x$ of the rotor poles are aligned with the stator poles.

Owing to its being constructed as described above, the rotor 5 naturally asumes a position such as that shown in full lines in Figure 3 when the current is switched off. Consequently, when the current is switched on and the stator teeth 3 and 4 are thereby oppositely polarised, each tooth 7 and 8 is subjected to attractive and repulsive magnetic forces which exert an immediate starting torque on the rotor when the current is switched on.

Instead of being bifurcated as described above and as shown in Figure 3, each tooth 8 or 9 may be so magnetised as to form two strongly polarised surfaces of like polarity corresponding to the polar surfaces 8a and 8b (or 9a and 9b) separated by an unpolarised or relatively weakly polarised region located at the axis of the pole.

The width of each rotor pole 8 and 9 preferably made equal to the pitch of the stator poles, the notch 10 or the unmagnetised interval between two strongly polarised surfaces being approximately equal to the width of the stator poles 2 and 3.

Figure 4 of the drawings shows an arrangement of rotor poles in which the desired result is obtained by displacing some of the rotor poles from their normal pitch positions relatively to the remaining rotor poles instead of by bifurcating the rotor poles.

As shown in Figure 4, the stator poles 3 and 4 are like those described with reference to Figures 1, 2 and 3 except that, for convenience, the number of poles in each set 2 and 3 is an even number in Figure 4, whereas an odd number was used in Figures 1 to 3.

The rotor 5 of Figure 4 is permanently magnetised so that its two ends are of opposite polarity, and it is formed with teeth or projections 11 at one end and with teeth or projections 12 at the other end, the teeth 11 and 12 forming rotor poles.

The teeth 11, which are of like polarity, are spaced apart by a distance equal to twice the pitch of the stator teeth (i. e. equal to the pitch of either of the two sets of teeth 2 and 3 taken separately). The teeth 12, which are also of like polarity, are also spaced apart from one another by a distance equal to twice the pitch of the stator teeth, but they are displaced from their normal pitch positions relatively to the teeth 11.

The normal pitch positions of the teeth 12 relatively to the teeth 11 above referred to are the positions that the teeth 12 would assume in a motor of normal design, i. e. are so chosen that the angular positions of the teeth 12 with respect to teeth 4 of one polarity correspond with the angular positions of the teeth 11 with respect to the teeth 3 of opposite polarity (having regard to the fact that the teeth 11 and 12 are of opposite polarity). In order to make this clear, a possible normal pitch position of the teeth 12 on centre lines $y$ corresponding to the centre lines $x$ of the teeth 11 has been shown in broken lines at A in Figure 4. It will be seen from the figure, that the teeth 12 are displaced from this normal pitch position by a distance equal to about half the pitch of the stator teeth.

Owing to the relative displacement of the rotor poles 11 and 12 described above, the magnetic forces exerted during a single half cycle of the operating current tend to move the rotor towards a position such as that shown in broken lines at B in Figure 4. The position shown at B in Figure 4 corresponds to the position of the rotor shown in broken lines in Figure 3. Both figures show the rotor at B approximately in one of the positions towards which the rotor is attracted during one half-cycle of the operating current.

To obtain the result aimed at by the present invention, these positions must be different from the positions of minimum magnetic reluctance between the rotor and stator poles. In the construction shown in Figures 1 to 3, this is achieved by the notches 10. To achieve the same result in the construction shown in Figure 4, the rotor teeth 10 and 11 are cut away on one side as shown at 13 to reduce the magnetic reluctance between the rotor and stator poles in positions of the rotor such as that shown at B.

When the stator current is switched off, therefore, the rotor is naturally attracted to a position of minimum magnetic reluctance such as that shown in full lines in Figure 4 corresponding to the rotor position shown in full lines in Figure 3. In this position, the teeth 11 and 12 are subject to magnetic forces which exert an immediate starting torque when the stator current is switched on.

In both forms of the invention shown in Figures 3 and 4, the number of teeth 2 and 3 or 11 and 12 may be varied from a minimum of two in all to the maximum number that can be accommodated according to the number of stator teeth.

It is to be noted that the notches 10 shown in Figure 3 and the cut-away portions 13 shown in Figure 4 both come opposite stator poles 3 or 4 in positions of rotation (such as those shown in broken lines) towards which the rotor is attracted during alternate half-cycles of the operating current. In both of the forms of the invention shown in Figures 3 and 4 therefore, the cut-away portions are effective to ensure that the magnetic reluctance of the air gaps between the rotor and the stator poles rises to a maximum in the successive positions towards which the rotor is attracted as aforesaid.

What we claim is:

1. A synchronous electric motor comprising a polarised rotor with north and south poles and a stator formed by an alternating magnet having two sets of teeth forming alternate stator poles evenly spaced round said stator and effective for attracting said rotor towards successive positions of rotation during successive half-cycles of operating current, said rotor and stator teeth having the same pole pitch unchanged throughout the circumference, wherein said rotor has teeth forming rotor poles having weakened or cut away portions to ensure a higher reluctance when the axis of the rotor poles lie radially opposite the stator poles than when the axis of the rotor poles lie between the stator poles, thus ensuring that the rotor comes to rest in the latter position where it will receive the maximum possible starting couple when the stator is energised with alternating current.

2. A synchronous electric motor comprising a polarized rotor and a stator formed by an alternating-current magnet having two sets of teeth forming alternate stator poles evenly spaced round said stator and effective for attracting said rotor towards successive positions of rotation during successive half-cycles of operating current, wherein said rotor has teeth forming rotor poles spaced apart by a distance equal to twice the pitch of the stator teeth, said rotor teeth being made wider than said stator teeth and each having a weakened or cut-away middle portion that comes opposite the stator poles in the successive positions of rotation towards which the rotor is attracted as aforesaid.

3. A synchronous electric motor according to claim 2 where said rotor teeth are bifurcated.

4. A synchronous electric motor according to claim 2 wherein said rotor teeth have middle portions that are weakly polarized.

References Cited in the file of this patent

UNITED STATES PATENTS

| Number | Name | Date |
|---|---|---|
| 1,913,506 | Nachumsohn | June 13, 1933 |
| 1,933,590 | Holtz et al. | Nov. 7, 1933 |
| 1,966,897 | Lofgren | July 17, 1934 |
| 1,976,880 | Graseby | Oct. 16, 1934 |

FOREIGN PATENTS

| Number | Country | Date |
|---|---|---|
| 28,539 | Great Britain | of 1902 |
| 388,739 | Great Britain | Feb. 28, 1933 |
| 451,447 | Great Britain | Aug. 6, 1936 |
| 781,076 | France | Feb. 18, 1935 |